(12) United States Patent
Rochin Machado et al.

(10) Patent No.: US 10,830,104 B2
(45) Date of Patent: Nov. 10, 2020

(54) EXHAUST COLLECTOR RAILING REMOVAL TOOL

(71) Applicant: General Electric Company, Schenectady, NY (US)

(72) Inventors: Jorge Mario Rochin Machado, Corregidora (MX); Oscar Eduardo Diaz Ruiz, El Marques (MX); Artemio Josue Aguilar, Queretaro (MX)

(73) Assignee: General Electric Company, Schenectady, NY (US)

( * ) Notice: Subject to any disclaimer, the term of this patent is extended or adjusted under 35 U.S.C. 154(b) by 657 days.

(21) Appl. No.: 15/336,077

(22) Filed: Oct. 27, 2016

(65) Prior Publication Data

US 2018/0119576 A1   May 3, 2018

(51) Int. Cl.
*F01D 25/28* (2006.01)
*F01D 25/30* (2006.01)
*B64F 5/50* (2017.01)

(52) U.S. Cl.
CPC .......... *F01D 25/285* (2013.01); *F01D 25/30* (2013.01); *B64F 5/50* (2017.01)

(58) Field of Classification Search
CPC ....... F01D 25/285; F01D 25/30; B64D 9/003; B64D 45/001; B62B 2206/00; B62B 2206/006; B62B 2206/02; B62B 2205/20; B62B 2501/00; F16B 7/044; F16M 11/20
USPC ......................................................... 269/55
See application file for complete search history.

(56) References Cited

U.S. PATENT DOCUMENTS

| 4,292,057 | A | | 9/1981 | Ulvestad et al. | |
|---|---|---|---|---|---|
| 4,799,656 | A | * | 1/1989 | Puskarich | B66F 5/02 254/134 |
| 5,114,295 | A | * | 5/1992 | Jansson | B66C 19/007 212/326 |
| 6,416,143 | B1 | * | 7/2002 | Janson | A47B 53/02 312/201 |
| 2006/0101645 | A1 | | 5/2006 | Stone | |
| 2009/0278021 | A1 | | 11/2009 | Jimeno De La Torre | |
| 2013/0206098 | A1 | | 8/2013 | Betts, Sr. | |
| 2013/0306830 | A1 | * | 11/2013 | Acuna | F01D 25/28 248/558 |
| 2014/0013768 | A1 | * | 1/2014 | Laing | F01D 25/285 60/796 |

FOREIGN PATENT DOCUMENTS

EP          2287074 A2    2/2011

* cited by examiner

*Primary Examiner* — Orlando E Aviles
*Assistant Examiner* — Seahee Hong
(74) *Attorney, Agent, or Firm* — Fletcher Yoder, P.C.

(57) ABSTRACT

A system includes a rail system configured to be disposed within an enclosed space housing an exhaust collector, wherein the exhaust collector is configured to couple to a gas turbine. The system also includes an exhaust collector removal tool configured to be disposed on the rail system. The exhaust collector removal tool is configured to couple to the exhaust collector, to support the exhaust collector when not coupled to the gas turbine engine, to move the exhaust collector in a vertical direction, and to move the exhaust collector laterally with respect to the enclosed space along the rail system.

18 Claims, 12 Drawing Sheets

FIG. 14

EXHAUST COLLECTOR RAILING REMOVAL TOOL

BACKGROUND

The subject matter disclosed herein relates to an exhaust collector coupled to a gas turbine engine and, more particularly, a tool for removing an exhaust collector from an enclosed space.

Exhaust collectors are often disposed in tight or enclosed spaces. For example, exhaust collects are disposed inside enclosed spaces such as engine rooms or vessels. The vessels may include, for example, ships and ferries, which often require the power from multiple engines to provide their motion. The engines typically produce exhaust, which is collected by the exhaust collector before exiting the system via a stack. Exhaust collectors inside vessels typically are designed to be removed from the top of the vessel. However, the stack and other equipment on top of the exhaust collector must be removed or cut in to before the exhaust collector can be removed from the top. Therefore, top removal is a costly and labor-intensive process.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a system is provided. The system includes a rail system configured to be disposed within an enclosed space housing an exhaust collector, wherein the exhaust collector is configured to couple to a gas turbine. The system also includes an exhaust collector removal tool configured to be disposed on the rail system. The exhaust collector removal tool is configured to couple to the exhaust collector, to support the exhaust collector when not coupled to the gas turbine engine, to move the exhaust collector in a vertical direction, and to move the exhaust collector laterally with respect to the enclosed space along the rail system.

In accordance with a second embodiment, an exhaust collector removal system is provided. The exhaust collector removal system includes a rail system configured to be disposed within an enclosed space housing an exhaust collector. The exhaust collector removal system includes an exhaust collector removal tool configured to be disposed on the rail system. The exhaust collector removal tool also includes a cradle configured to be disposed underneath the exhaust collector, wherein the cradle is configured to support the exhaust collector when the exhaust collector is not coupled to a gas turbine engine. The exhaust collector removal tool further includes a first side support and a second side support disposed on opposite ends of the cradle that are configured to flank lateral sides of the exhaust collector. Both the first side support and the second side support each include a top portion, a base portion, and an intermediate portion extending vertically between the base portion and the top portion. The top portion is configured to couple to the exhaust collector and the base portion is coupled to the cradle. The exhaust collector removal tool yet further includes a plurality of wheels configured to be disposed on the rail system and coupled to respective base portions of the first and second side supports that enable the exhaust collector removal tool and the exhaust collector to be moved along the rail system to move the exhaust collector laterally with respect to the enclosed space along the rail system.

In accordance with a third embodiment, an exhaust collector removal tool for removing an exhaust collector from an enclosed space is provided. The exhaust collector removal tool includes a cradle configured to be disposed underneath the exhaust collector. The cradle is configured to support the exhaust collector when the exhaust collector is not coupled to a gas turbine engine. The exhaust collector removal tool also includes a first side support and a second side support disposed on opposite ends of the cradle that are configured to flank lateral sides of the exhaust collector. Both the first side support and the second side support each include a top portion, a base portion, and an intermediate portion extending vertically between the base portion and the top portion. The top portion is configured to couple to the exhaust collector and the base portion is coupled to the cradle. The exhaust collector removal tool further includes a plurality of wheels configured to be disposed on a rail system and coupled to respective base portions of the first and second side supports that enable the exhaust collector removal tool and the exhaust collector to be moved along the rail system to move the exhaust collector laterally with respect to the enclosed space along the rail system.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to a system for removing an exhaust collector from an enclosed space (e.g., enclosed within a marine vessel such as a ship or ferry). The system includes a railing system that may be assembled inside the enclosed space, underneath the exhaust collector. The system also includes an exhaust collector removal tool ("tool") that includes several sections: a first side support, a second side support, a cradle between the side supports, and wheels coupled to the bottoms of the side supports. The tool may be assembled underneath and surrounding the exhaust collector and disposed on the railing system. The tool may be coupled to the exhaust collector, lifted to a vertical position, and then locked in to the vertical position to lift the exhaust collector. The railing system then provides a path for the tool coupled to the exhaust collector to move along in a longitudinal and a lateral direction. Additional railing may be coupled to the railing system to permit the tool coupled to the exhaust collector to move with respect to the enclosed space. In some embodiments, the exhaust collector may be moved out of the enclosed space. By moving the tool coupled to the exhaust collector laterally with respect to the enclosed space, the expense and labor of removing the components above the exhaust collector and the exhaust collector by top removal is avoided.

Figure 1:
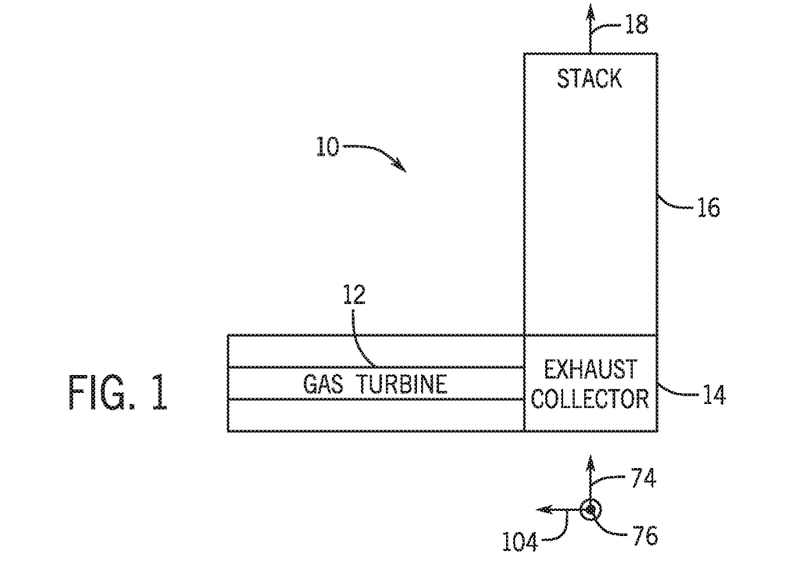
FIG. 1 is a schematic side view of an embodiment of a gas turbine system having a gas turbine coupled to an exhaust collector.

FIG. 1 is a schematic side view of an embodiment of a gas turbine system 10 having a gas turbine engine 12 inside a gas turbine enclosure coupled to an exhaust collector 14. The gas turbine engine 12 and the exhaust collector 14 extend longitudinally in a longitudinal direction 104. The gas turbine engine 12 is configured to drive an electrical generator. A gas turbine enclosure is coupled to an air inlet region which directs air (e.g., from an external environment) into the gas turbine engine 12. For example, the air inlet region may direct air into a compressor of the gas turbine engine 12. For example, the gas turbine engine 12 may compress the air received from the air inlet region, mix the air with fuel, and combust the air-fuel mixture to drive one or more turbines. Exhaust gases 18 leave the gas turbine engine 12 and are gathered inside the exhaust collector 14. The exhaust collector 14 is coupled to an exhaust stack 16 for venting the exhaust gases 18 in a vertical direction 74 from the exhaust collector 14. The gas turbine engine 12 also includes a drive shaft that extends through the enclosure in the longitudinal direction 104 of the gas turbine engine 12 and the exhaust collector 14 and couples to the generator.

In some embodiments, an exhaust collector removal tool may be of great assistance in removing the exhaust collector 14 laterally from the system 10 for repair or replacement. In particular, the tool may advantageously couple to and support the exhaust collector 14. The tool may be height-adjustable so that the tool coupled to the exhaust collector 14 may be advantageously lifted in the vertical direction 74. The tool may also have wheels and be disposed on a railing system so the exhaust collector 14 may be pushed or pulled inside the system 10 longitudinally along the direction 104 or pushed or pulled from the system 10 laterally along a radial direction 76 of the gas turbine engine 12.

Figure 2:
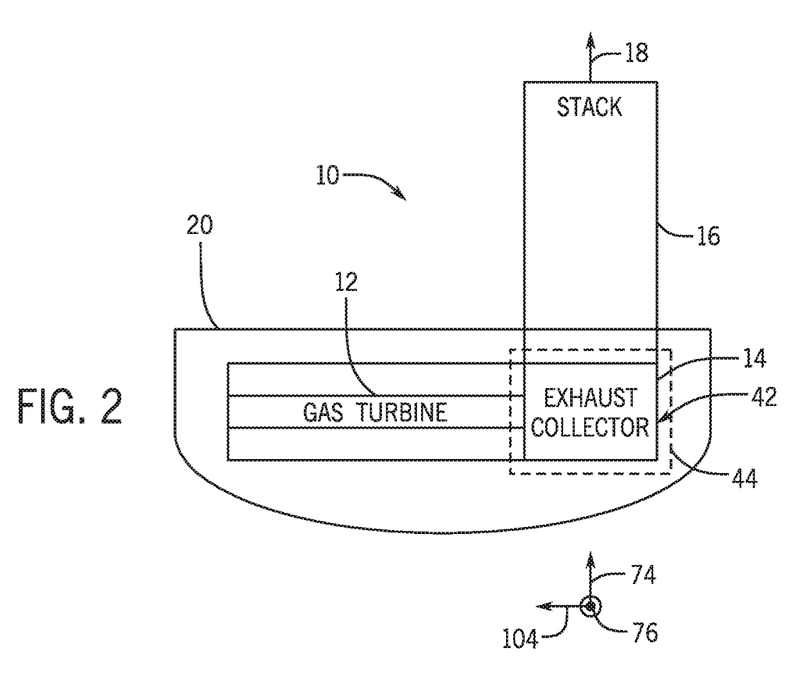
FIG. 2 is a schematic side view of an embodiment of the gas turbine system disposed inside an enclosed space of a vessel.

FIG. 2 is a schematic side view of an embodiment of the gas turbine system 10 disposed inside an enclosed space 42 of a marine vessel 20 (such as a ship or a ferry). In the current embodiment, the stack 16 extends through the top of the enclosed space 42 in the vertical direction 74. As described above, exhaust gas 18 created in the gas turbine engine 12 is gathered in the exhaust collector 14 and leaves the gas turbine system 10 through the stack 16.

The confines of the enclosed space 42 may make removal of the exhaust collector 14 difficult. Further, the exhaust collector 14 may be a very heavy and complicated piece of equipment. Many exhaust collectors 14 are currently designed to be removed from gas turbine systems 10 from the top, a process hereby referred to as top removal. When the exhaust collector 14 needs to be removed (e.g. for repair or replacement), the stack 16 and other equipment that may be disposed on top of the exhaust collector may need to be moved or cut through before the exhaust collector 14 can be removed. A system including an exhaust collector removal tool may be used to move the exhaust collector 14 laterally (e.g., from the side of the vessel 20) in the radial direction 76 with respect to the enclosed space 42 of the gas turbine engine 12. The system may also be used to move the exhaust collector 14 longitudinally (e.g., along a longitudinal axis of the gas turbine engine 12) in a direction 104 with respect to the enclosed space 42 of the gas turbine engine 12.

In some embodiments, an opening 44 may be created in the side of the vessel 20 (or other enclosure) adjacent the enclosed space 42 where the exhaust collector 14 resides. The opening 44 may be created by a machine or by an operator and may be in line with the exhaust collector 14 along the radial direction 76. In general, this opening 44 may provide room to assemble an exhaust collector removal tool and to couple it to the exhaust collector 14. Therefore, the opening 44 must be large enough for at least the exhaust collector 14 to move though it laterally along the radial direction 76 of the gas turbine engine 12.

Figure 3:
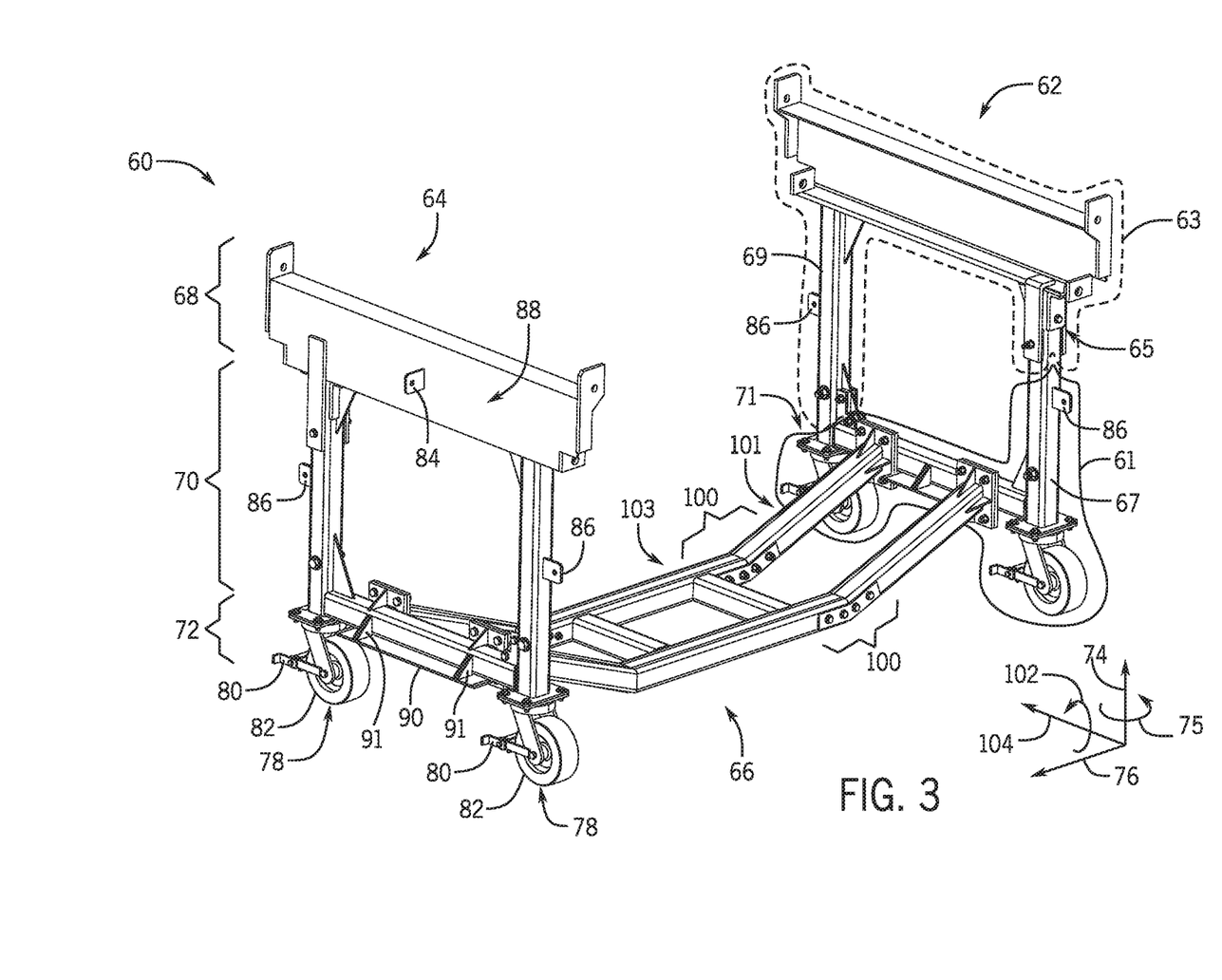
FIG. 3 is a perspective view of an embodiment of an exhaust collector removal tool configured to remove the exhaust collector from an enclosed space.

FIG. 3 is a perspective view of an embodiment of an exhaust collector removal tool ("tool") 60 configured to remove the exhaust collector 14 from an enclosed space 42 (e.g., on a marine vessel). Coordinates including the radial direction 76 relative to the exhaust collector 14, the longitudinal direction 104 relative to the exhaust collector 14, and a circumferential direction 102 around the longitudinal direction 104 relative to the exhaust collector 14 may be useful in describing the present embodiments. The tool may be assembled inside the enclosed space 42 and underneath and surrounding the exhaust collector 14 while disposed on the railing system. The tool 60 includes a first side support 62. The first side support 62 is configured to be disposed on a side of the enclosed space 42 opposite the opening 44. The tool 60 also includes a second side support 64 (e.g., configured to be disposed on a side of the enclosed space 42 near the opening 44) and a cradle 66 coupled to and extending between the side supports 62, 64. Each side support 62, 64 includes a top portion 68, a base portion 72, and an intermediate portion 70 extending in the vertical direction 74 (e.g., radially relative to the exhaust collector 14) between the top portion 68 and the bottom portion 72. The cradle 66 extends between the side supports 62, 64 in the radial direction 76. The cradle 66 is coupled to internal faces of the bottom portion 72 of both side supports 62, 64 with fasteners (e.g. bolts, screws etc.) or welding techniques. The cradle 66 may be coupled to the side supports 62, 64 at different steps in the removal process. In some embodiments, the cradle 66 is coupled to the second side support 64 before the tool 60 or components of the tool 60 are brought into the enclosed space 42 and then the cradle 66 is coupled to the first side support 62 after the first side support 62 is disposed in the enclosed space 42.

Wheels 78 are coupled to the bottom of the base portions 72 of the side supports 62, 64. In some embodiments, a plurality of wheels 78 (e.g., two or more) may be coupled to each base portion 72. As depicted in FIG. 3, two wheels 78 are coupled to each base portion 72. In some embodiments, the wheels 78 may be able to rotate partially or completely along a circumferential direction 75 around the vertical direction 74. The wheels 78 enable movement of the exhaust collector 14 from the enclosed space along a rail system. The wheels 78 may also include wheel brakes 80. The wheel brakes 80 may be moved (e.g. by an operator) between two positions: a locked position and an unlocked position. The wheel brakes 80 may be manually pressed from the upright, unlocked position in to the lower, locked position, and vice versa. In the unlocked position, the wheel brakes 80 do not keep the wheels 78 from rolling, rotating, or moving. In contrast, in the locked position, the wheel brakes 80 keep the wheels 78 from rolling, rotating, or moving by contacting rolling portions 82 of the wheels 78 and frictionally holding them in place. The wheels 78 should be kept in the locked position until it the exhaust collector 14 is fully coupled to the tool 60 and ready to be moved.

Additionally, the side supports 62, 64 may include middle lifting eyes 84 and side lifting eyes 86. The middle lifting eyes 84 may extend out (e.g. laterally) from an outer face 88 of the top portion 68 of the side supports 62, 64 in a plane created by the directions 74 and 76. The side lifting eyes 86 may extend out (e.g., axially) from the outer edges of the intermediate portions 70 of the side supports 62, 64 in a plane created by the directions 74 and 104. Lifting eyes 84, 86 additionally or alternatively be placed in other locations on the tool 60. Winches with cables or other pulling devices (not shown) may be coupled to the lifting eyes 84, 86 to provide a force to move (e.g., pull or lift) the tool 60 and the exhaust collector 14 to a desired location.

Although the present disclosure refers to cables coupled to the lifting eyes 84, 86, it is to be understood that in the spirit of the present disclosure, any other length of strong material could be used as a pulling device and be coupled to the lifting eyes 84, 86. The pulling devices could be chains, ropes, fibers, or other materials.

The first side support 62 may be separated in to two portions: a first portion shown by outline 61 and a second portion shown by outline 63. The first portion 61 includes the wheels 78 and the base portion 72 to which they may be coupled, as well as the half of the intermediate section 67 depicted underneath a first linking device 65. The second portion 63 may include the top portion 68, the first linking device 65, and the half of the intermediate section 69 without the first linking device 65. The first linking device 65 may be used to partially couple the two portions 61, 63 together. Additionally, the portions 61, 63 may be coupled at second linking device 71. Bolts or other coupling devices may be used to hold the portions 61, 63 together through aligned holes on each linking device 65, 71. Because the first side support 62 is on the far side of the enclosed space 42 from the opening 44, it may be advantageous to place each portion 61, 63 of the first side support 62 beside the exhaust collector 14 separately, then couple them together with the linking devices 65, 71. In this manner, both side supports 62, 64 are configured to flank the exhaust collector 14.

A lifting plate 90 is coupled to the bottom of each base portion 72 of the side supports 62, 64. The lifting plates 90 are welded, screwed, or bolted or otherwise coupled to the base portions 72. Lifting devices may be used to lift the tool 60 by applying force from underneath the tool 60 to the lifting plates 90. The lifting plates 90 may be flat areas of metal, wider in the radial direction 76 than the framework of the base portions 72, and thus create a reliable location from which to lift the tool 60. The lifting plates 90 include lifting supports 91 configured to hold the lifting plates 90 flat or otherwise support the lifting plates 90 when a force is applied to the lifting plates 90. In the present embodiment, the lifting supports 91 are triangles disposed in the plane created by the vertical direction 74 and the radial direction 76, two on each side of each lifting plate. However, in other embodiments, the lifting supports 91 may be of a different shape, or a different quantity, or excluded altogether. Further, the lifting plates 90 may be of the same width as the base portions 72 or excluded altogether.

Additionally, the tool 60 has an adjustable height. When the tool 60 is lifted, the wheels 78 remain disposed on the railing system and the side supports 62, 64 extend in height. In particular, the tool 60 may be made of a hollow framework structure and the side supports 62, 64 may have an interior structure coupled to the wheels 78 that remains in place, disposed on the railing system, when the outer structure of the side supports 62, 64 and cradle 66 are lifted. The height adjustable features of the tool 60 are described in greater detail with FIGS. 7 and 8.

As described in greater detail below, some embodiments of the cradle 66 include flexible joints 100 (e.g., rotatable joints). The flexible joints 100 permit a first portion 101 of the cradle 66 to move relative to a second portion 103 of the cradle 66 (e.g. flex in the circumferential direction 102 about the longitudinal axis 104). The flexible joints 100 enable the cradle 66 to be disposed underneath the exhaust collector 14 within the enclosed space 42. Once the cradle 66 is in place underneath the exhaust collector 14, the flexible joints 100 may be locked in to place.

Figure 4:
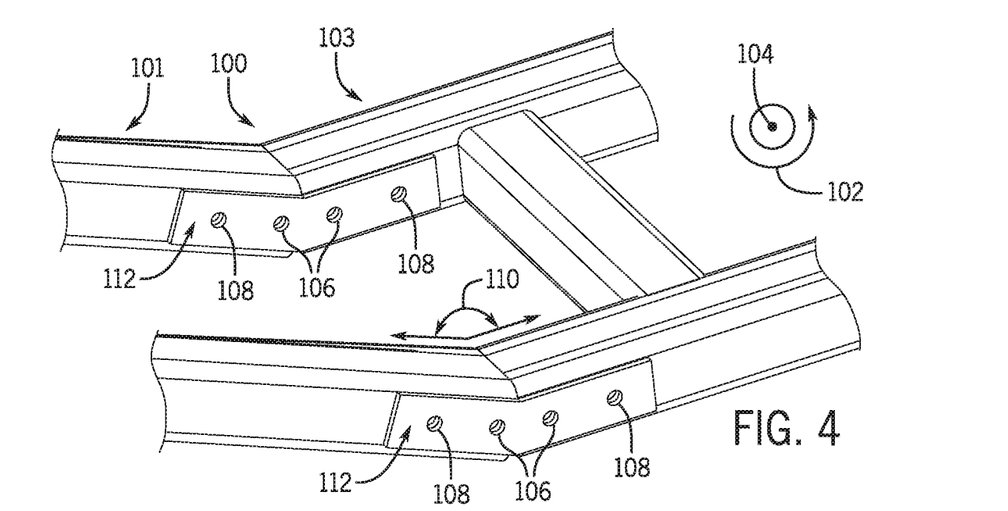
FIG. 4 is a close up perspective view illustrating an embodiment of the flexible joints of a cradle of an exhaust collector removal tool.

FIG. 4 is a close up perspective view illustrating an embodiment of the flexible joints 100 of the cradle 66. In some embodiments, the cradle 66 may have two flexible joints 100, one along each side of the cradle 66. The flexible joints 100 may be locked in a horizontal or an angled position to aid in the assembling of the tool 60. The flexible joints 100 include inner openings 106 and outer openings 108 to receive fasteners (e.g., bolt, pin, screw, etc.). When fasteners are placed only in the inner openings 106, the flexible joint 100 is held at the horizontal or generally horizontal position to enable the cradle 66 to be disposed underneath the exhaust collector 14 without physical interference from the exhaust collector 14. Alternatively, the fasteners may be removed from the inner openings 106 and via the flexible joints 100, the first portion 101 of the cradle 66 may move relative to the second portion 103 of the cradle 66 (e.g. flex in a circumferential direction 102 about the longitudinal axis 104) to a second, angled position. The angled position corresponds to the outer openings 108. Then fasteners may be placed only in the outer openings 108 to hold the flexible joint 100 at a bent angle 110, which is less than 180 degrees, wherein the cradle 66 may then be coupled to the first side support 62 via the linking devices, 65, 71.

In some embodiments, the flexible joints 100 may include brackets 112. In the current embodiment, two brackets 112 are used for each flexible joint 100. It is to be understood that different quantities of flexible joints 100 or different quantities of brackets 112 per flexible joint 100 may be utilized on the cradle 66. By moving fasteners between the inner openings 106 and the outer openings 108, the framework of the cradle 66 is locked into different positions. In particular, the brackets 112 may hold the first portion 101 of the cradle 66 and the second portion 103 of the cradle at desired angles to create either the horizontal or the angled position.

In some embodiments, when the tool 60 is being assembled inside the enclosed space 42, the flexible joints 100 are in the horizontal position. It may be easier to dispose the tool 60 beneath the exhaust collector 14 while the flexible joints 100 are in this position. Additionally, before the tool 60 is coupled to exhaust collector 14, or the first side support 62, the flexible joints 100 may be locked in to the angled position, so that the cradle 66 is generally symmetric and can support the weight of the exhaust collector 14 equally along its length when coupled to the exhaust collector 14.

Figure 5:
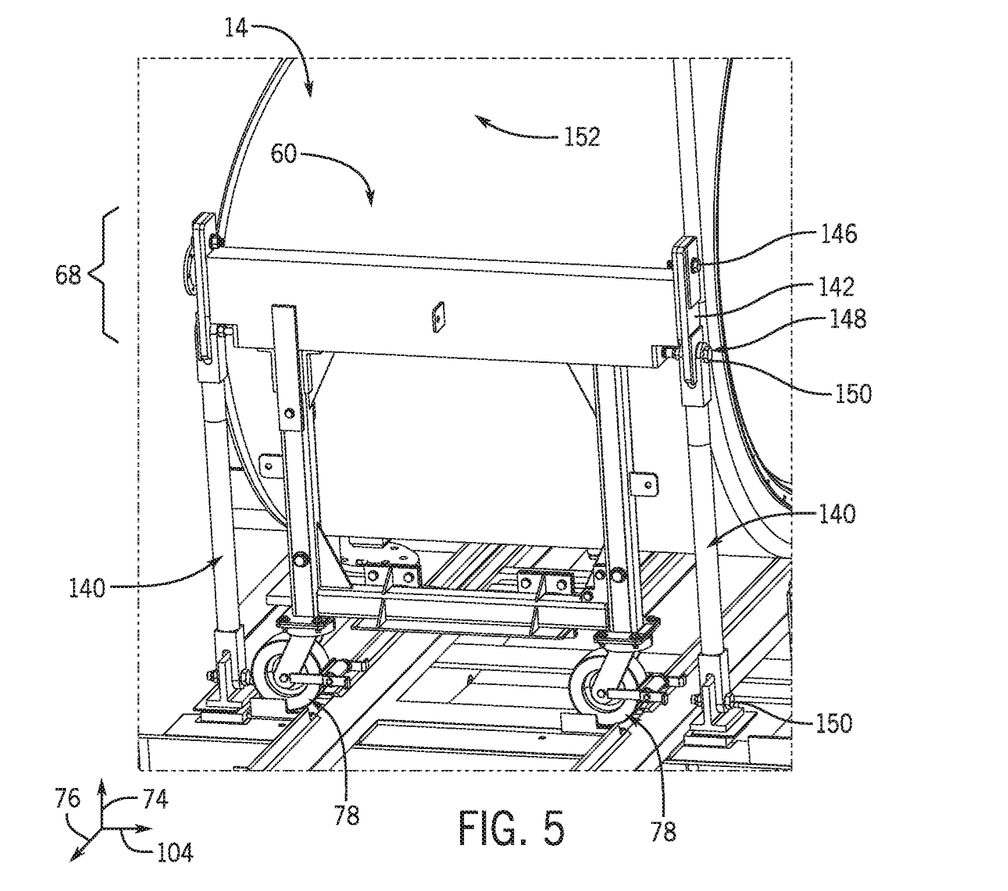
FIG. 5 is a perspective view illustrating an embodiment of the exhaust collector coupled to the exhaust collector removal tool.

FIG. 5 is a perspective view illustrating an embodiment of the exhaust collector 14 coupled to the tool 60 (without the tool 60 supporting the exhaust collector 14). In some embodiments, during operation of the gas turbine system 10, top portions of clevis supports 140 are coupled to support plates 142 of the exhaust collector 14 and bottom portions of clevis supports 140 are coupled to the bottom of the enclosed space 42. When coupled to the support plates 142, the clevis supports 140 may support a portion of the weight of the exhaust collector 14 and/or help lock it in to place during operation. To remove the exhaust collector 14 from the enclosed space 62, the tool 60 must support the weight of the exhaust collector 14, and the clevis supports 140 must be removed. To do so, the top portions 68 of the side supports 62, 64 may be coupled or fastened (e.g., bolted) to the support plates 142. Each top portion 68 has two openings for receiving fasteners: a top opening 146 and a bottom opening 148. The openings 146, 148 are aligned with respective openings of the support plates 142 for receiving fasteners, so fasteners may be disposed within the openings 146, 148 and the respective openings of the support plate 142 to couple the top portion 68 to the support plate 142. Next, the top portion 68 may be coupled to the exhaust collector 14 through each of the exposed top openings 146, one on each end of the lateral side 152 of the exhaust collector 14. Then, the clevis supports 140 may be removed from the support plate 142 by removing both clevis fasteners 150 (e.g. one from each end of the clevis 140) from each clevis 140.

Figure 6:
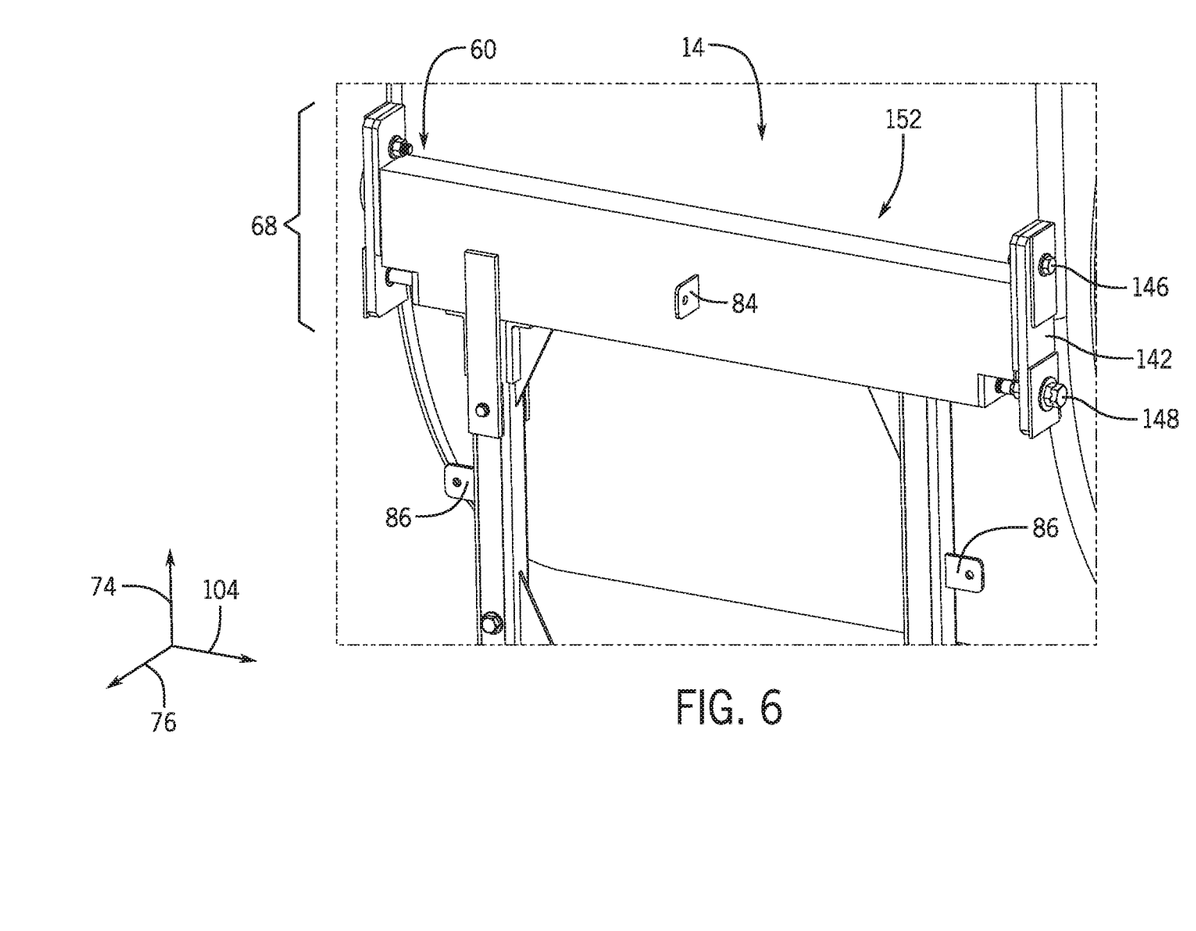
FIG. 6 is a close up perspective view illustrating an embodiment of a top portion of the exhaust collector removal tool coupled to the exhaust collector.

FIG. 6 is a close up perspective view illustrating an embodiment of the top portion 68 of the tool 60 coupled to the exhaust collector 14. As illustrated, the clevis supports 140 are removed, the exhaust collector 14 is fully coupled to the tool 60, and the tool 60 supports the weight of the exhaust collector 14. Fasteners are disposed in the openings of the support plates 142 and the respective top opening 146 and the bottom opening 148 of the top portions 68 of each side support 62, 64. Thus, the tool 60 and the exhaust collector 14 are coupled together, as shown. In particular, the cradle 66 is disposed underneath the exhaust collector 14 and the side supports 62, 64 are coupled to the support plates 142 to flank each lateral side 152 of the exhaust collector 14.

Figure 7:
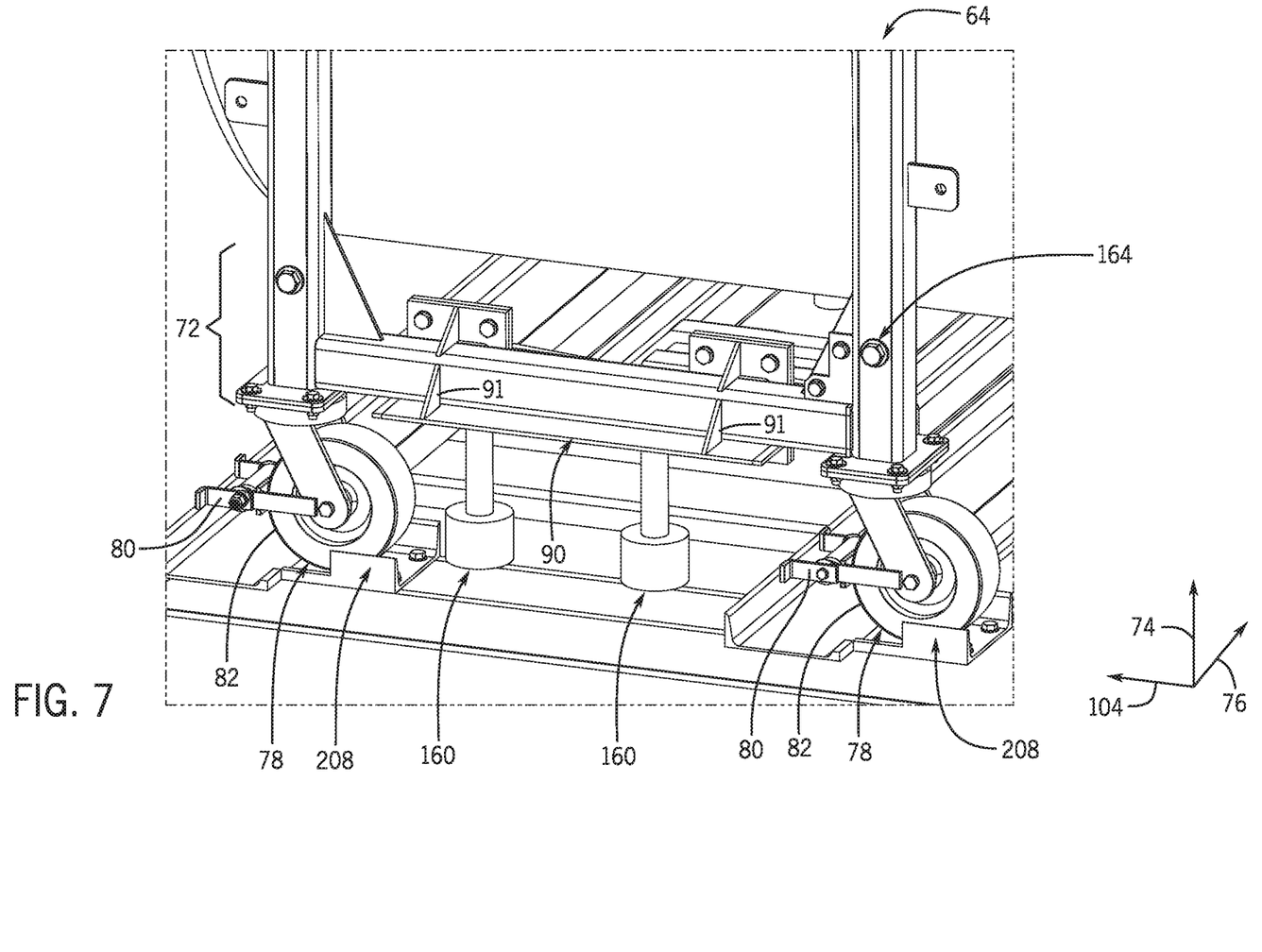
FIG. 7 is a perspective view illustrating an embodiment of lifting devices disposed underneath the exhaust collector removal tool (e.g., prior to lifting the tool)
Figure 8:
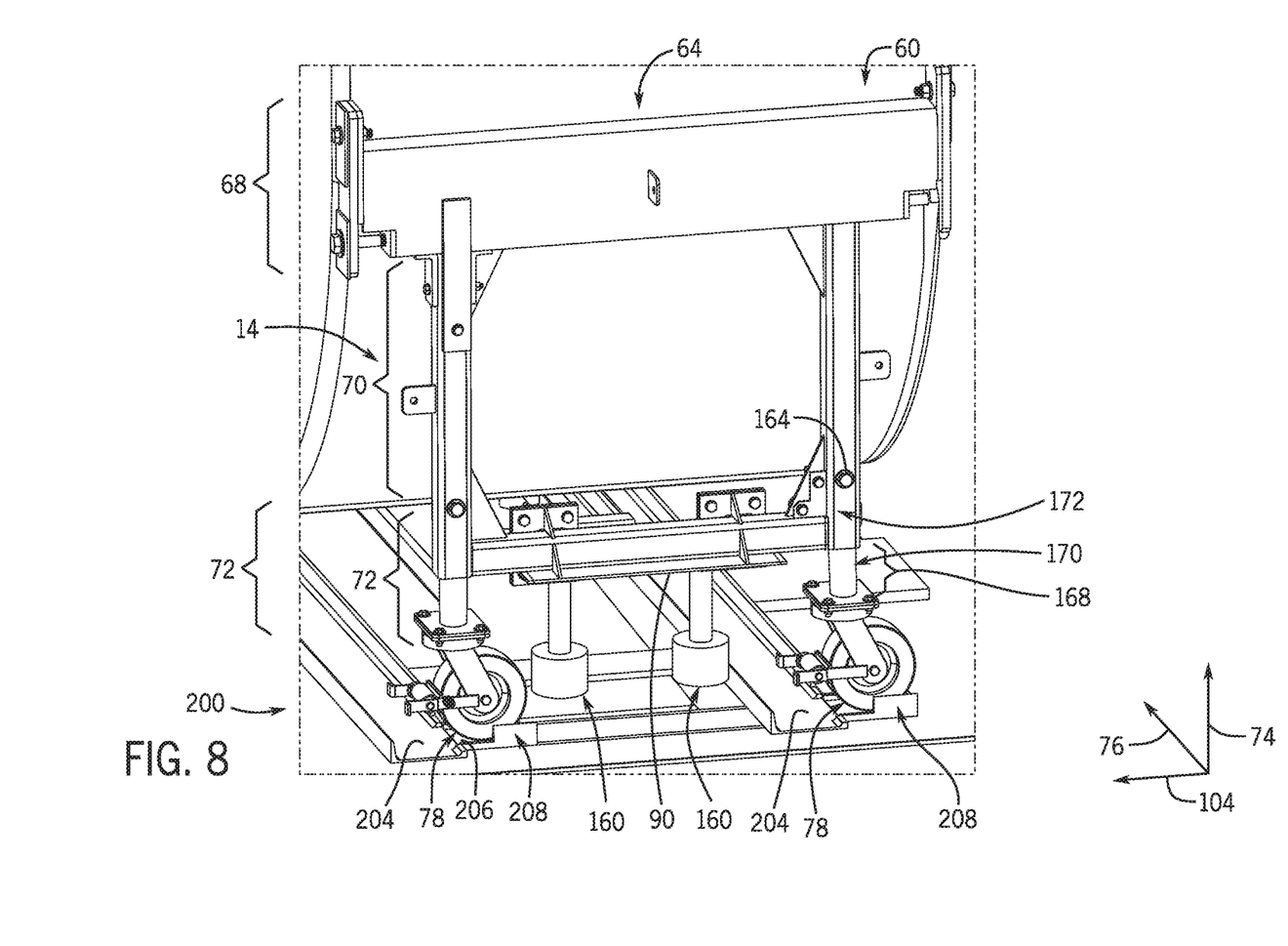
FIG. 8 is a perspective view illustrating an embodiment of lifting devices disposed underneath the exhaust collector removal tool (e.g., after lifting the tool) while the exhaust collector removal tool is in a first removal position.

FIGS. 7 and 8 are perspective views illustrating embodiments of lifting devices 160 (e.g., jacks, bottle jacks, or other types of lifting devices) beneath a lifting plate 90 coupled to the base portion 72 of the second side support 64. As depicted in FIG. 7, the lifting plate 90 is coupled to the underside of the base portion 72 of each side support 62, 64. One or more of the lifting devices 160 are located beneath the lifting plate 90, so they may apply a force on the relatively large surface area of the lifting plate 90 in order to lift a portion of the tool 60. Additionally, there is at least one lifting plate 90 and lifting device 160 on each of the two sides of the tool 60 (e.g., side supports 62, 64). In some embodiments, there are two lifting devices 160 in place under each lifting plate 90. However, in certain embodiments, there may be a different quantity of lifting devices 160 under each lifting plate 90 (e.g., 1, 3, 4, 5, etc.). Coupling the exhaust collector 14 to the tool 60 and lifting the exhaust collector 14 coupled to the tool 60 are completed while the wheels 78 are in the locked position, to increase the precision and control of the present disclosure.

As depicted, an opening 164 is configured to receive a fastener (e.g., bolt, pin, screw, etc.) on the intermediate portion 70 of the side support 64. In FIG. 7, the lifting devices 160 are not in a lifted position and the tool 60, now coupled to the exhaust collector 14, is not locked in a vertical position via the opening 164. However, the whole assembly can be lifted slowly and progressively to a total lifted height via the lifting devices 160. The total lifted height should be large enough that any structures on the bottom of the exhaust collector 14 that extend into the floor of the enclosed space 42 to hold the exhaust collector 14 in place (e.g., shear key) are lifted such that the lowest portions of the structures are at least above the floor of the enclosed space 42 and the railing system.

As depicted in FIG. 8, the lifting devices 160 are in a lifted position. The lifting devices 160 apply a lifting force to the bottom of the lifting plate 90. Thus, the height adjustable side supports 62, 64, the cradle 66, and the exhaust collector 14 are also in a lifted position, visualized by a distance 168 the side supports 62, 64 are lifted relative to the wheels 78. The wheels 78 remain in the same place, in the locked position and contacting a rail system 200 which is described fully below. Openings of the tool 60 are aligned to enable fasteners (e.g., bolts, pins, screws, etc.) to be disposed into them in order to lock the tool 60 in the lifted position.

The tool 60 may be made of a hollow framework structure. Additionally, extending in the direction 74 from the wheels 78, an inner framework 170 may be disposed inside the side supports 62, 64. The opening 164 is a first hole through a front face 172 of the intermediate portion 70. A second opening (not shown) through the front face 172 of the inner framework 170 is located higher than the first hole (e.g. at an additional height equal to the height 168) when the tool 60 is not in the lifted position. The tool may be locked in the lifted position when a fastener is disposed through the openings to couple the inner framework 170 to the intermediate portion 70, whenever the intermediate portion 70 is lifted to the height 168. These openings and fasteners can be referred to as a locking mechanism which holds the tool 60 in the lifted position. There may be more than one opening located on each intermediate portion 70 or on each inner framework 170, such that any desired height 168 corresponds to lifted positions in which the locking mechanism may secure the tool 60.

As depicted, the tool 60 is in a first removal position. In this position, the tool 60 is fully assembled, coupled to the exhaust collector 14, lifted, and disposed on the minor rails 206 with the rolling portions 82 of the wheels 78 aligned with the longitudinal axis 104. The present embodiment is the first removal position with or without the lifting devices 160 disposed underneath the tool 60. Further removal positions in which the tool 60 coupled to the exhaust collector 14 may be arranged are described fully with FIGS. 10-12 below.

Figure 9:
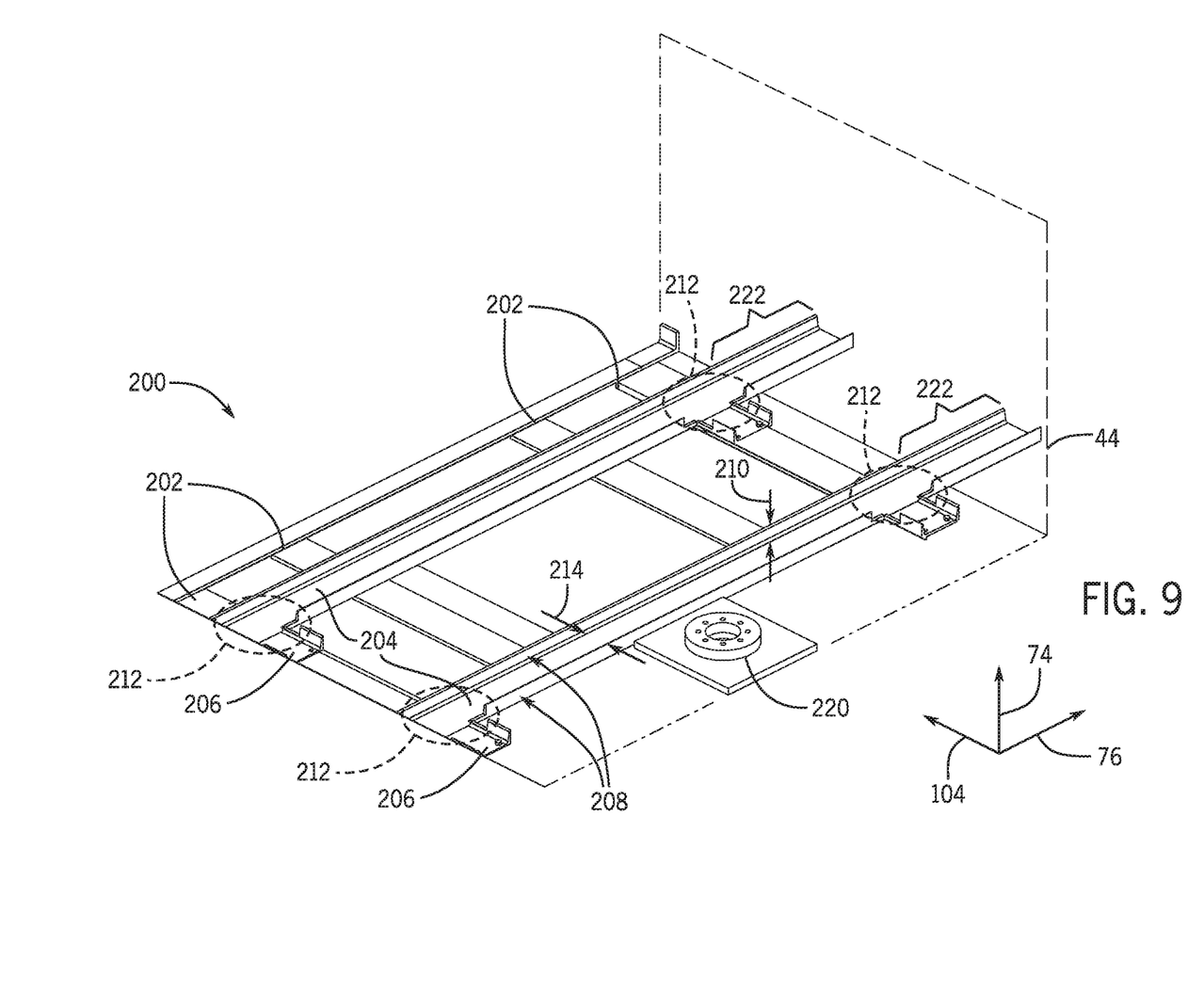
FIG. 9 is a perspective view illustrating an embodiment of a railing system.

FIG. 9 is a perspective view illustrating an embodiment of a railing system 200. The railing system 200 may include a plurality of supports 202 or plates which extend across the enclosed space 42 in the direction 104, parallel to the longitudinal axis of the exhaust collector 14. In some embodiments, the supports 202 intersect and reinforce main rails 204, which extend across the enclosed space 42 in the radial direction 76. Additionally, minor rails 206, aligned in the same direction 104 as the supports 202, are coupled to the main rails 204 at several edges of the main rails 204 inside the enclosed space 42. In some embodiments, there are two minor rails 206 coupled to each of the two main rails 204. Both the main rails 204 and the minor rails 206 may be supported from beneath by the supports 202. Further, exterior rails 222 may be coupled to the main rails 204 and supported so that the rail system 200 extends out of the opening 44. In some embodiments, the main rails 204 may be the exterior rails 222 if the main rails 204 have a length longer than the length of the enclosed space 42, such that they naturally extend out of the enclosed space 42. Any rails extending outside the opening may be supported from beneath with supports 202 or other supporting arrangements.

The main rails 204, minor rails 206, and exterior rails 222 may have walls 208 on their edges that extend a wall height 210 in the vertical direction 74. The walls 208 may keep wheels 78 or other structures of the tool 60 on the rail system 200. Additionally, the walls 208 may prevent the wheels 78 from rotating.

In some embodiments of the rail system 200, there may be cutouts 212, illustrated as regions in which the walls 208 are not present. Where cutouts 212 are not present, and walls 208 are present instead, the width 214 of each rail and the wall height 210 may interfere with (e.g. physically block) any wheels 78 on the rail system 200 and prevent them from rotating. The cutouts 212 may be located on the inner corners where the minor rails 206 are coupled to the main rails 204. The cutouts 212 may only be present on the side of the main rails 204 that are coupled to the minor rails 206, so that the sides of the main rails 204 opposite the minor rails 206 have walls 208 along their entire length. The cutouts 212 may permit the wheels 78 to fully rotate around a point. The end of the minor rails 206 away from the main rails 204 may not have a wall 208, because wheels 78 may not roll towards that end.

The main rails 204 extend through the opening 44 in the enclosed space 42, providing a path for the exhaust collector 60 coupled to the exhaust collector 14 to move laterally with respect to the enclosed space 42. The movement of the tool 60 and exhaust collector 14 progresses through several steps, described fully below.

Figure 10:
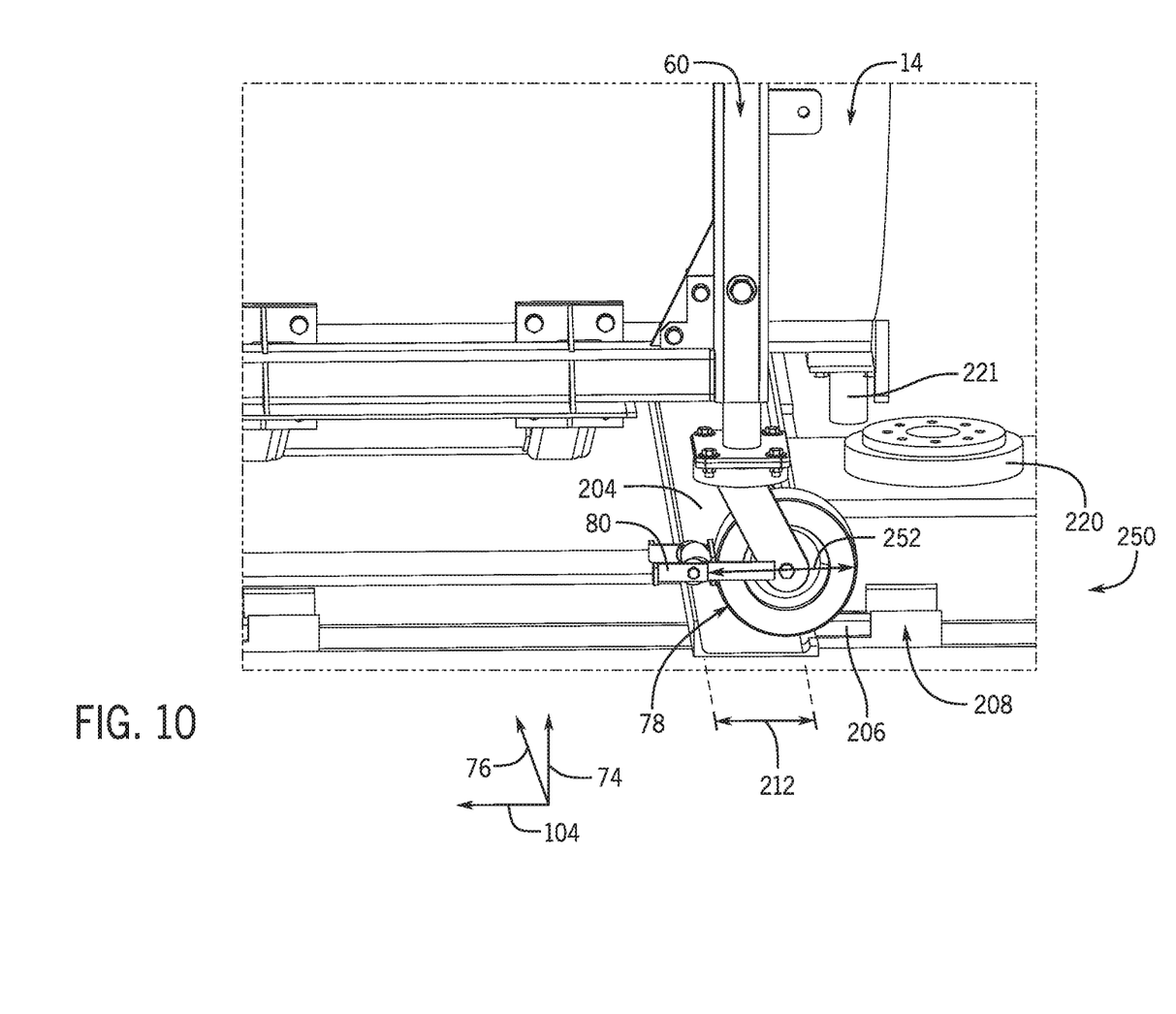
FIG. 10 is a perspective view illustrating an embodiment of the exhaust collector removal tool coupled to the exhaust collector in a second removal position.

Initially, when placed or constructed inside the enclosed space 42, the tool 60 may be disposed so that the wheels 78 are on the minor rails 206 and aligned with the rolling portions 82 directed along the direction 104. The wheel brakes 80 lock the wheels 78 in to this position so the tool 60 does not move until movement of the tool 60 is desired. This position is the first removal position, as seen by the position of the exhaust collector 14 and the tool 60 in FIG. 8. In the first removal position, the exhaust collector 14 may already be coupled to the tool 60 and may already be lifted until the shear key 221 is lifted from a shear key base 220 until the shear key 221 can clear the railing system 200. Then, cables or other pulling devices (not shown) are attached to the at least one middle lifting eyes 84, the wheel brakes 80 are moved to the unlocked position so the wheels 78 may move, and a force is applied (e.g. by a winch) to the pulling device to move the tool 60 coupled to the exhaust collector 14 forward in the direction 104 along the minor rails 206 to a second removal position 250.

FIG. 10 is a perspective view illustrating an embodiment of the tool 60 coupled to the exhaust collector 14 in the second removal position 250. In the second removal position 250, the wheels 78 remain unlocked and are facing in the same longitudinal direction 104 in which the minor rails 206 extend.

In some embodiments, the wheels 78 have a diameter 252 which may be larger than the rail width 214. Additionally, the wall height 210 may also be large enough to interfere with the wheels 78 and keep the wheels 78 from rotating. It is therefore important to locate the cutouts 212 at regions of the rail system 200 where rotation of the wheels 78 is needed (e.g. at the joints between the main rails 204 and the minor rails 206).

Figure 11:
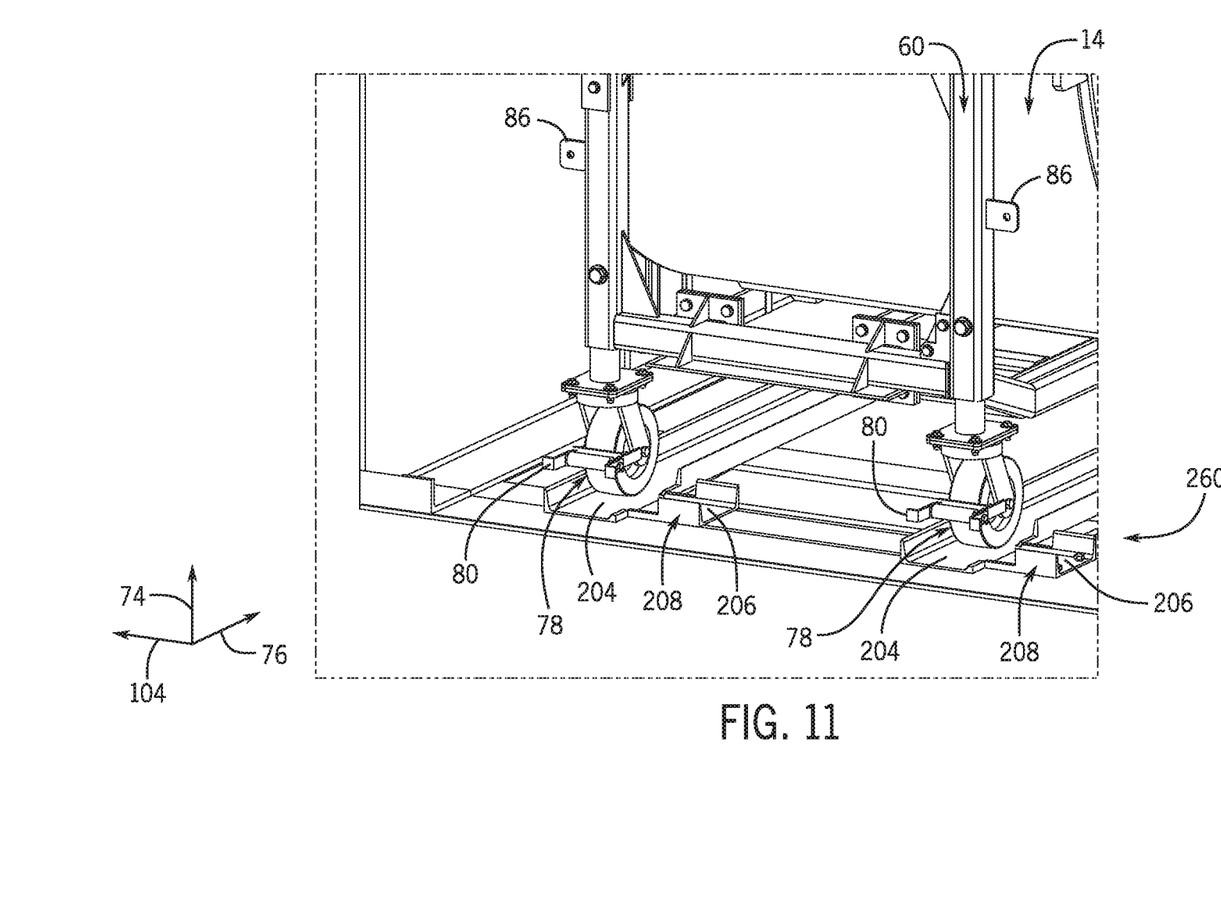
FIG. 11 is a perspective view illustrating an embodiment of the exhaust collector removal tool coupled to the exhaust collector in a third removal position.

FIG. 11 is a perspective view illustrating an embodiment of the tool 60 coupled to the exhaust collector 14 in a third removal position 260. In this position, the tool 60 coupled to the exhaust collector 14 includes wheels 78 that are aligned with the main rails 204 along the direction 76. The wheels 78 may be rotated 90 degrees from the second removal position 250 to form the third removal position 260. Pulling devices are now coupled to at least one of the side lifting eyes 86. The pulling devices can then be used to apply a pulling force in the direction 76 (or pushing devices may be used to provide a pushing force in the opposite direction) and move the tool 60 coupled to the exhaust collector 14 along the main rails 204 towards the opening 44 in the radial direction 76.

Figure 12:
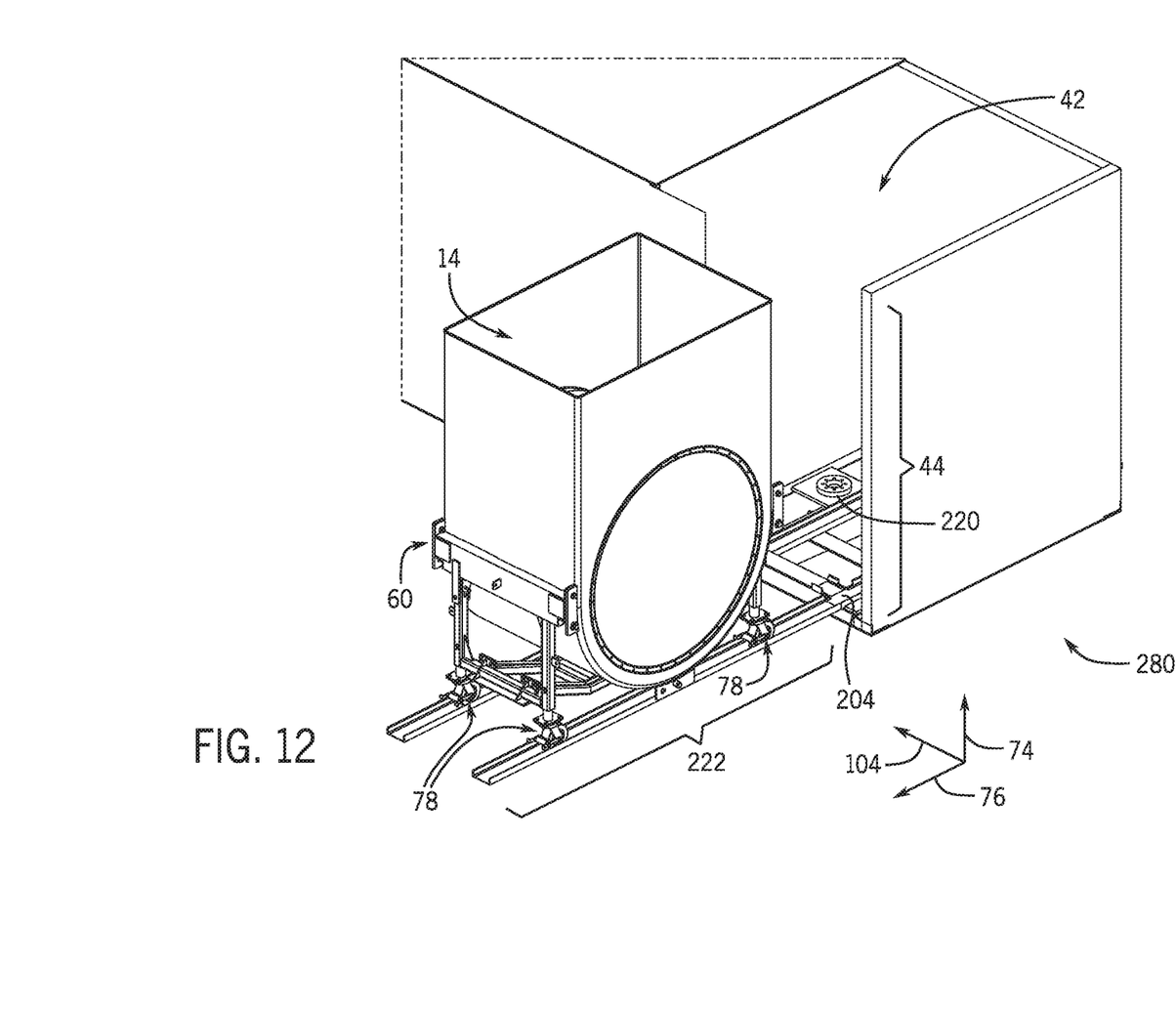
FIG. 12 is a perspective view illustrating an embodiment of the exhaust collector removal tool coupled to the exhaust collector in a fourth removal position.

FIG. 12 is a perspective view illustrating an embodiment of the tool 60 coupled to the exhaust collector 14 in a fourth removal position 280. Exterior rails 222 extend from the main rails 204 in the radial direction 76. In the fourth removal position 280, the tool 60 coupled to the exhaust collector 14 has been moved from the third removal position 260. The tool 60 coupled to the exhaust collector 14 moved laterally in the radial direction 76 along the main rails 204 and along the exterior rails 222 through the opening 44 to outside of the enclosed space 42.

Figure 13:
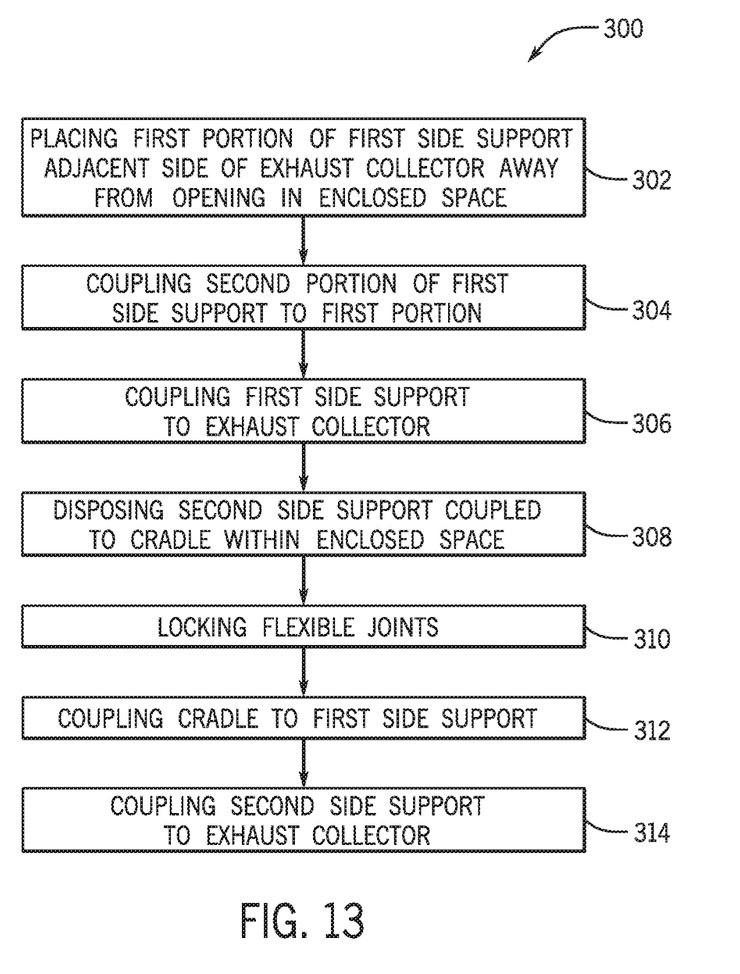
FIG. 13 is a flow chart illustrating an embodiment of a method for assembling the exhaust collector removal tool.

FIG. 13 is a flow chart illustrating an embodiment of a method 300 for assembling the tool 60. The method 300 will be described as assembling the tool 60 in the same enclosed space 42 as an exhaust collector 14, but it is to be understood that in the spirit of the present disclosure, the tool 60 may be assembled in a different way or in a different place. In the depicted embodiment, the method 300 includes placing (block 302) the first portion 61 of the first side support 62 adjacent the side of the exhaust collector 14 away from the opening 44 in the enclosed space 42. The method 300 then includes coupling (block 304) the second portion 63 of the first side support 62 to the first portion 61 via at least one of the linking devices 65, 71. Additionally, the method 300 includes coupling (block 306) the first side support 62 to the exhaust collector 14 by removing the clevis supports 140 from the adjacent side of the exhaust collector 14 and disposing fasteners through the top potion 68 of the first side support 62 and through the support plates 142. The method 300 also includes disposing (block 308) the second side support 64, which is already be coupled to the cradle 66, within the enclosed space 42. In the present embodiment, the tool 60 is assembled with the cradle 66 initially in the horizontal position. Further, the method 300 includes locking (block 310) the flexible joint 100 in to the bent position. With the cradle 66 extending underneath the exhaust collector 14, the fasteners are moved from the inner openings 106 to the outer openings 108 of the flexible joints to lock it in the bent position. Then, the method 300 includes coupling (block 312) the cradle 66 to the first side support 62. In the angled position, the cradle 66 can be coupled to the first side support 62 with fasteners. Finally, the method 300 includes coupling (block 314) the second side support 64 to the exhaust collector 14 by removing the clevis supports 140 from the adjacent side of the exhaust collector 14 and disposing fasteners through the top potion 68 of the second side support 64 and through the support plates 142.

Figure 14:
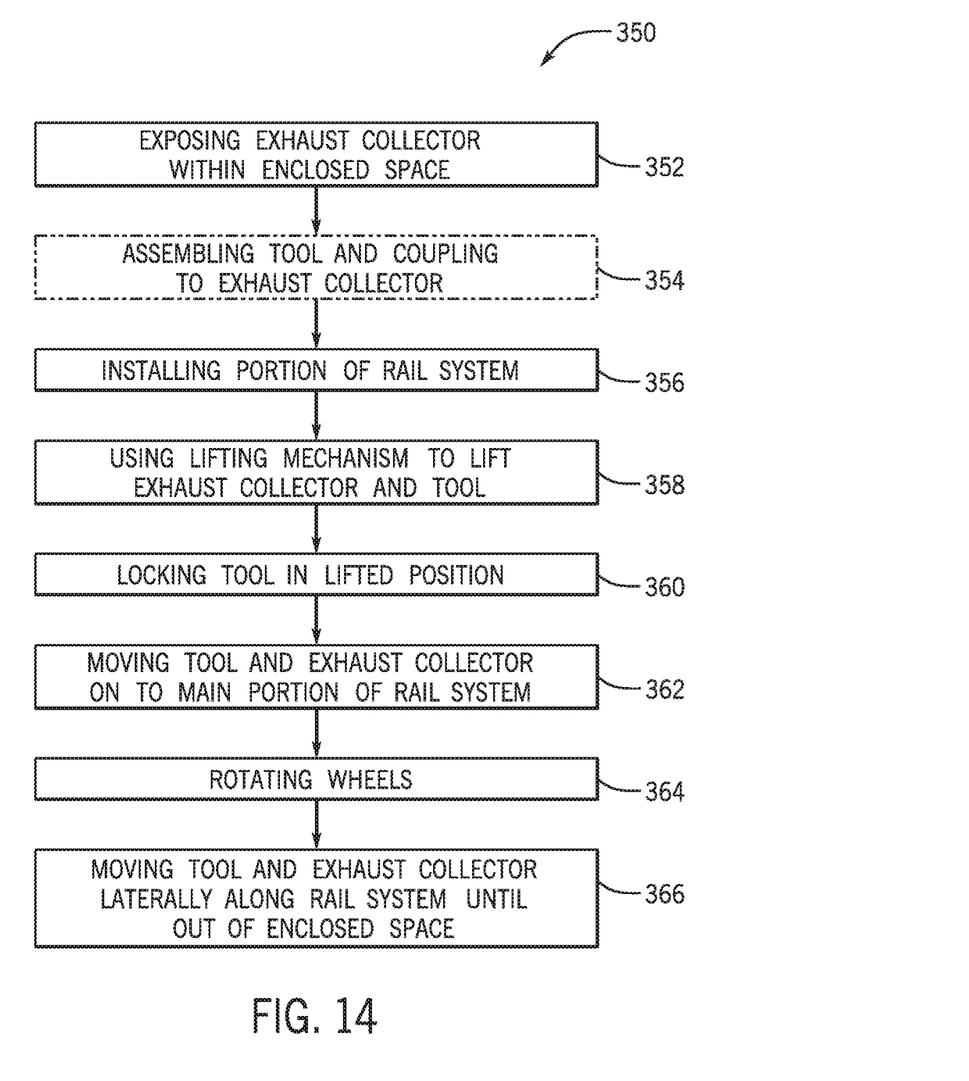
FIG. 14 is a flow chart illustrating an embodiment of a method for removing the exhaust collector from the enclosed space.

FIG. 14 is a flow chart illustrating an embodiment of a method 350 for removing the exhaust collector 14 from the enclosed space 42. The method 350 includes exposing (block 352) the exhaust collector 14 within the enclosed space 42. This step may be accomplished by creating an opening 44 in a side of the enclosed space 42 (e.g., of a marine vessel). Optionally, the method 350 includes assembling (block 354) the tool 60 and coupling it to the exhaust collector 14, according to all or a portion of the method 300. The method 350 further includes installing (block 356) the rail system 200. As discussed above, the rail system 200 includes supports 202, main rails 204 extending in the radial direction 74 inside the enclosed space 42, and minor rails 206 coupled to the main rails. Exterior rails 222 that extend out of the enclosed space 42 through the opening 44 may be attached to or included as a part of the main rails 204. Next, the method 350 includes using lifting devices 160 to lift (block 358) the tool 60 coupled to the exhaust collector 14. The lifting devices apply a force to the lifting plates 90 of the tool 60 to lift the cradle 66 and side supports 62, 64 of the tool 60 to the lifted position while the wheels 78 remain disposed on the rail system 200. Then, the method 350 includes locking (block 360) the tool 60 in the lifted position, by disposing fasteners through respective openings of the locking mechanism. Next, the method 350 further includes moving (block 362) the tool from the first removal position to the second removal position 250. To move the tool 60, the wheel brakes 80 are moved to the unlocked position. Then, pulling devices apply a force to the front lifting eyes 84 to pull the tool 60 in the longitudinal direction 104. The method 350 then include rotating (block 364) the wheels 78 to form the third removal position 260. Finally, the method 350 includes moving (block 366) the tool 60 coupled to the exhaust collector 14 laterally along the main rails 204 until the exhaust collector 14 is out of the enclosed space 42, forming the fourth removal position 280. In particular, pulling devices are attached to the side lifting eyes 86 and a pulling force is applied to the tool 60 to move it in the radial direction 76 along the main rails 204, through the opening 44, and along the exterior rails 220 until the tool 60 coupled to the exhaust collector 14 is out of the enclosed space 42.

Technical effects of the disclosed subject matter include a system for removing the exhaust collector 14 laterally from the enclosed space 42. The tool 60 may be assembled on the rail system 200 inside the enclosed space 42. The tool 60 may then be coupled to the exhaust collector 14 inside the enclosed space 42. The rail system 200 extends inside the enclosed space 42, through the opening 44 of the enclosed space 42, and out of the enclosed space 42. The tool 60 coupled to the exhaust collector 14 may then be moved easily along the rail system 200 in the radial direction 76 and/or the longitudinal direction 104 with respect to the enclosed space 42. The exhaust collector 14 is part of the gas turbine system 10 so the stack 18 and other heavy equipment may be disposed on top of the exhaust collector 14. Additionally, the exhaust collector 14 may need to be repaired or replaced often. The present disclosure provides a system for removing the exhaust collector 14 laterally from the enclosed space 42 to save the time and effort required to cut through or remove the equipment on top of the exhaust collector 14.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a rail system configured to be disposed within an enclosed space housing an exhaust collector, wherein the exhaust collector is configured to couple to a gas turbine; and
an exhaust collector removal tool configured to be disposed on the rail system, wherein the exhaust collector removal tool comprises a cradle comprising a first portion, a second portion, and a flexible joint disposed between the first and second portions that enables the first portion to move relative to the second portion in a circumferential direction about a longitudinal axis of the gas turbine, and wherein the exhaust collector removal tool is configured to couple to the exhaust collector, to support the exhaust collector when not coupled to the gas turbine engine, to move the exhaust collector in a vertical direction, and to move the exhaust collector laterally with respect to the enclosed space along the rail system, and wherein the flexible joint is configured to be locked in an angled position in which the first portion of the cradle is angled relative to the second portion of the cradle when the exhaust collector removal tool is supporting the exhaust collector, the first and second portions of the cradle comprise a first plurality of openings, wherein the cradle comprises a bracket having a second plurality of openings, and wherein the flexible joint is configured to be locked in the angled position via fasteners disposed through a target portion of the first and second plurality of openings.

2. The system of claim 1, wherein the cradle is configured to be disposed underneath the exhaust collector, and wherein the cradle is configured to support the exhaust collector when the exhaust collector is not coupled to the gas turbine engine.

3. The system of claim 1, wherein the cradle comprises a hollow framework structure.

4. The system of claim 1, wherein the flexible joint enables the first portion of the cradle to move with respect to the second portion of the cradle to enable the cradle to be disposed underneath the exhaust collector.

5. The system of claim 1, wherein the exhaust collector removal tool comprises a first side support and a second side support disposed on opposite ends of the cradle that are configured to flank lateral sides of the exhaust collector.

6. The system of claim 5, wherein both the first and second side supports each comprise a top portion, a base portion, and an intermediate portion extending vertically between the base portion and the top portion.

7. The system of claim 6, wherein the top portion is configured to couple to the exhaust collector via fasteners, and wherein the base portion is coupled to the cradle.

8. The system of claim 7, wherein the top portion comprises a lifting eye that enables the exhaust collector to be pulled along the rail system to move the exhaust collector laterally with respect to the enclosed space.

9. The system of claim 7, wherein the intermediate portion comprises at least one lifting eye that enables the exhaust collector to be pulled along the rail system in an axial direction relative to a longitudinal axis of the gas turbine engine.

10. The system of claim 7, comprising at least one lifting device, wherein the base portion comprises a plate, and the at least one lifting device is configured to apply a force underneath the plate to vertically lift the base portion, the intermediate portion, the top portion, the cradle, and the exhaust collector.

11. The system of claim 10, wherein respective intermediate portions of the first and second side supports comprise a locking mechanism to lock a vertical position of the first and second side supports upon being vertically lifted by the at least one lifting device.

12. The system of claim 10, wherein the exhaust collector removal tool comprises a plurality of wheels configured to be disposed on the rail system and coupled to respective base portions of the first and second side supports that enable the exhaust collector removal tool and the exhaust collector to be moved along the rail system.

13. The system of claim 12, wherein the plurality of wheels is configured to remain in contact with the rail system while the first and second side supports are vertically lifted by the at least one lifting device.

14. The system of claim 12, wherein when the plurality of wheels is positioned in a first location in contact with the rail system, the exhaust collector removal tool and the exhaust collector are blocked from moving laterally with respect to the enclosed space along the rail system.

15. The system of claim 14, wherein when the plurality of wheels is positioned in a second location in contact with the rail system different from the first location, the exhaust collector removal tool and the exhaust collector are allowed to move laterally with respect to the enclosed space along the rail system.

16. The system of claim 1, wherein the cradle is configured to be coupled to a first side support and a second side support of the exhaust collector removal tool after the cradle is disposed underneath the exhaust collector and after the flexible joint is locked in the angled position.

17. The system of claim 1, wherein the exhaust collector removal tool comprises a first side support and a second side support disposed on opposite ends of the cradle, and wherein the first and second side supports are configured to couple to respective support plates of the exhaust collector via fasteners extended between the first and second side supports and the respective support plates.

18. The system of claim 1, wherein the exhaust collector removal tool comprises a plurality of wheels configured to be disposed on the rail system, wherein the rail system comprises a plurality of main rails and a plurality of minor rails extending perpendicularly relative to the plurality of main rails, wherein walls of the plurality of minor rails are configured to physically block the plurality of wheels from moving laterally with respect to the enclosed space when the exhaust collector removal tool is in a first removal position, and wherein the walls are configured to enable the plurality of wheels to move laterally with respect to the enclosed space when the exhaust collector removal tool is in a second removal position.

* * * * *